United States Patent
Chin

(10) Patent No.: US 10,938,294 B1
(45) Date of Patent: Mar. 2, 2021

(54) DOORBELL CIRCUIT ARCHITECTURE

(71) Applicant: Amazon Technologies, Inc., Seattle, WA (US)

(72) Inventor: Douglas Mark Chin, Windham, NH (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 115 days.

(21) Appl. No.: 16/142,876

(22) Filed: Sep. 26, 2018

Related U.S. Application Data

(60) Provisional application No. 62/651,475, filed on Apr. 2, 2018.

(51) Int. Cl.
| | |
|---|---|
| *H02M 1/08* | (2006.01) |
| *H04N 5/232* | (2006.01) |
| *G08B 3/10* | (2006.01) |
| *H02M 1/00* | (2006.01) |
| *H02M 7/06* | (2006.01) |

(52) U.S. Cl.
CPC .............. *H02M 1/08* (2013.01); *G08B 3/10* (2013.01); *H04N 5/23241* (2013.01); *H02M 7/06* (2013.01); *H02M 2001/0009* (2013.01)

(58) Field of Classification Search
CPC ........ G01K 7/02; G08B 3/10; G08B 13/1418; G08B 25/016; H01H 13/02; H02M 1/08; H02M 7/06; H02M 2001/0009; H04N 5/225; H04N 5/23241; H04N 7/186; E05B 39/04; E05F 15/60; G01R 19/16571; G06Q 10/1093; H02G 3/14; H02J 3/12; H02J 50/80; H04L 12/2818; H04M 1/0291; H04M 11/025; H05B 45/37

USPC ......... 320/101, 107, 124; 327/544; 340/326, 340/328, 392.1, 393.3, 533, 538.16, 340/573.3, 287, 384.7, 392.5, 692; 348/143, 207.1, 370, 371, 372; 379/167.05; 396/55, 205; 600/103; 307/131

See application file for complete search history.

(56) References Cited

U.S. PATENT DOCUMENTS

| | | | | |
|---|---|---|---|---|
| 5,570,083 A | * | 10/1996 | Johnson | G08B 3/10 340/326 |
| 5,748,074 A | * | 5/1998 | Chomet | G08B 3/10 340/328 |
| 5,764,031 A | * | 6/1998 | Mishima | H02J 7/0024 320/124 |

(Continued)

*Primary Examiner* — Gerald Gauthier
(74) *Attorney, Agent, or Firm* — K&L Gates LLP

(57) ABSTRACT

Devices and techniques are generally described for a doorbell camera circuit architecture. In some examples, at least one processor of a doorbell device may generate a first control signal. The at least one processor may send the first control signal to a power-switching control circuit of the doorbell device. The power-switching control circuit may receive a first input electrical signal. The power-switching control circuit may store at least a portion of energy associated with the first input electrical signal in a plurality of capacitors of the power-switching control circuit. The power-switching control circuit may supply power from the plurality of capacitors to a camera of the doorbell device during a first state of the control signal. In various examples, the power-switching control circuit may supply power from the battery to the camera of the doorbell device during a second state of the control signal.

20 Claims, 10 Drawing Sheets

(56) References Cited

U.S. PATENT DOCUMENTS

| | | | | |
|---|---|---|---|---|
| 5,774,039 A * | 6/1998 | Housley | | G08B 3/10 340/326 |
| 6,414,589 B1 * | 7/2002 | Angott | | G08B 1/08 340/326 |
| 6,751,410 B1 * | 6/2004 | Stavely | | G03B 17/00 348/E5.046 |
| 7,403,232 B1 * | 7/2008 | Orlicki | | G06F 1/1626 348/372 |
| 8,525,469 B1 * | 9/2013 | Laceky | | H02J 7/35 320/101 |
| 8,937,659 B1 * | 1/2015 | Scalisi | | G08B 3/10 348/143 |
| 9,282,665 B1 * | 3/2016 | Ladanyi | | H05B 45/37 |
| 9,697,723 B1 * | 7/2017 | Ladanyi | | G08B 7/06 |
| 9,859,741 B1 * | 1/2018 | Beagley | | G08B 29/181 |
| 10,325,453 B2 * | 6/2019 | Chen | | G08B 3/10 |
| 2004/0164872 A1 * | 8/2004 | Chiu | | G08B 3/10 340/692 |
| 2005/0001585 A1 * | 1/2005 | Tashiro | | H01M 10/46 320/107 |
| 2005/0040954 A1 * | 2/2005 | McNally | | A01K 1/035 340/573.3 |
| 2005/0062877 A1 * | 3/2005 | Yuyama | | H04N 5/2256 348/371 |
| 2007/0008081 A1 * | 1/2007 | Tylicki | | G08B 3/10 340/392.1 |
| 2007/0052531 A1 * | 3/2007 | Mathews | | G10K 1/062 340/533 |
| 2007/0217779 A1 * | 9/2007 | Haas | | G03B 7/26 396/205 |
| 2008/0139881 A1 * | 6/2008 | Cover | | H04N 5/2256 600/103 |
| 2008/0297339 A1 * | 12/2008 | Mathews | | H04L 12/10 340/538.16 |
| 2010/0026382 A1 * | 2/2010 | Higaki | | H05K 7/00 327/544 |
| 2010/0225455 A1 * | 9/2010 | Claiborne | | G08B 3/10 340/384.7 |
| 2010/0245060 A1 * | 9/2010 | Tylicki | | G08B 3/10 340/393.3 |
| 2012/0293310 A1 * | 11/2012 | Fitzgibbon | | G08B 3/10 340/328 |
| 2012/0306630 A1 * | 12/2012 | Gilbert | | G08B 3/10 340/287 |
| 2015/0109113 A1 * | 4/2015 | Scalisi | | G08B 3/10 340/328 |
| 2015/0146018 A1 * | 5/2015 | Kayser | | H04N 1/00204 348/207.1 |
| 2015/0161856 A1 * | 6/2015 | Wilson | | G08B 3/10 340/392.1 |
| 2015/0312462 A1 * | 10/2015 | Sakamaki | | H04N 5/23241 348/370 |
| 2016/0300476 A1 * | 10/2016 | Kasmir | | G08B 3/10 |
| 2017/0193763 A1 * | 7/2017 | Wei | | H02M 5/257 |
| 2017/0213428 A1 * | 7/2017 | Lamas | | G08B 3/10 |
| 2017/0221318 A1 * | 8/2017 | Chen | | G08B 3/10 |
| 2017/0339262 A1 * | 11/2017 | Scalisi | | G08B 3/10 |
| 2017/0358952 A1 * | 12/2017 | Butler | | E06B 3/04 |
| 2018/0026452 A1 * | 1/2018 | Kim | | H02J 7/007 307/131 |
| 2018/0033287 A1 * | 2/2018 | De Mel | | G08B 3/10 |
| 2018/0191930 A1 * | 7/2018 | Jeong | | G08B 3/10 |
| 2018/0195333 A1 * | 7/2018 | Jeon | | E05F 15/60 |
| 2018/0234531 A1 * | 8/2018 | Ekkel | | G08B 13/22 |
| 2018/0322743 A1 * | 11/2018 | Chen | | H04M 1/0291 |
| 2018/0340350 A1 * | 11/2018 | Johnson | | G07C 9/00571 |
| 2019/0108733 A1 * | 4/2019 | Roosli | | H02G 3/14 |
| 2019/0149775 A1 * | 5/2019 | Alamgir | | G08B 13/1966 348/143 |
| 2019/0206228 A1 * | 7/2019 | Bhattacharya | | H04N 7/181 |
| 2019/0306432 A1 * | 10/2019 | Chen | | H04N 5/23241 |
| 2020/0336329 A1 * | 10/2020 | Scalisi | | G08B 3/10 |

\* cited by examiner

DOORBELL CIRCUIT ARCHITECTURE

CROSS-REFERENCE TO RELATED APPLICATIONS

This application claims the benefit of and priority to U.S. Provisional Application No. 62/651,475, filed Apr. 2, 2018, the disclosure of which is incorporated herein by reference in its entirety.

BACKGROUND

Doorbell circuits often include a doorbell transformer, typically 16 volts alternating current (VAC) and 10 volt amperes (VA), with a secondary coil connected to a chime through a push-button switch. Doorbell buttons are often illuminated. The illuminator is typically a lightbulb wired in parallel with the doorbell button. The push-button switch is normally open. When the push-button switch is closed, the chime rings and the light in the doorbell button goes out. When an illuminated doorbell button is not pressed, the light is on, powered by current running through the chime that is insufficient to cause the chime to ring.

DETAILED DESCRIPTION

Figure 1:
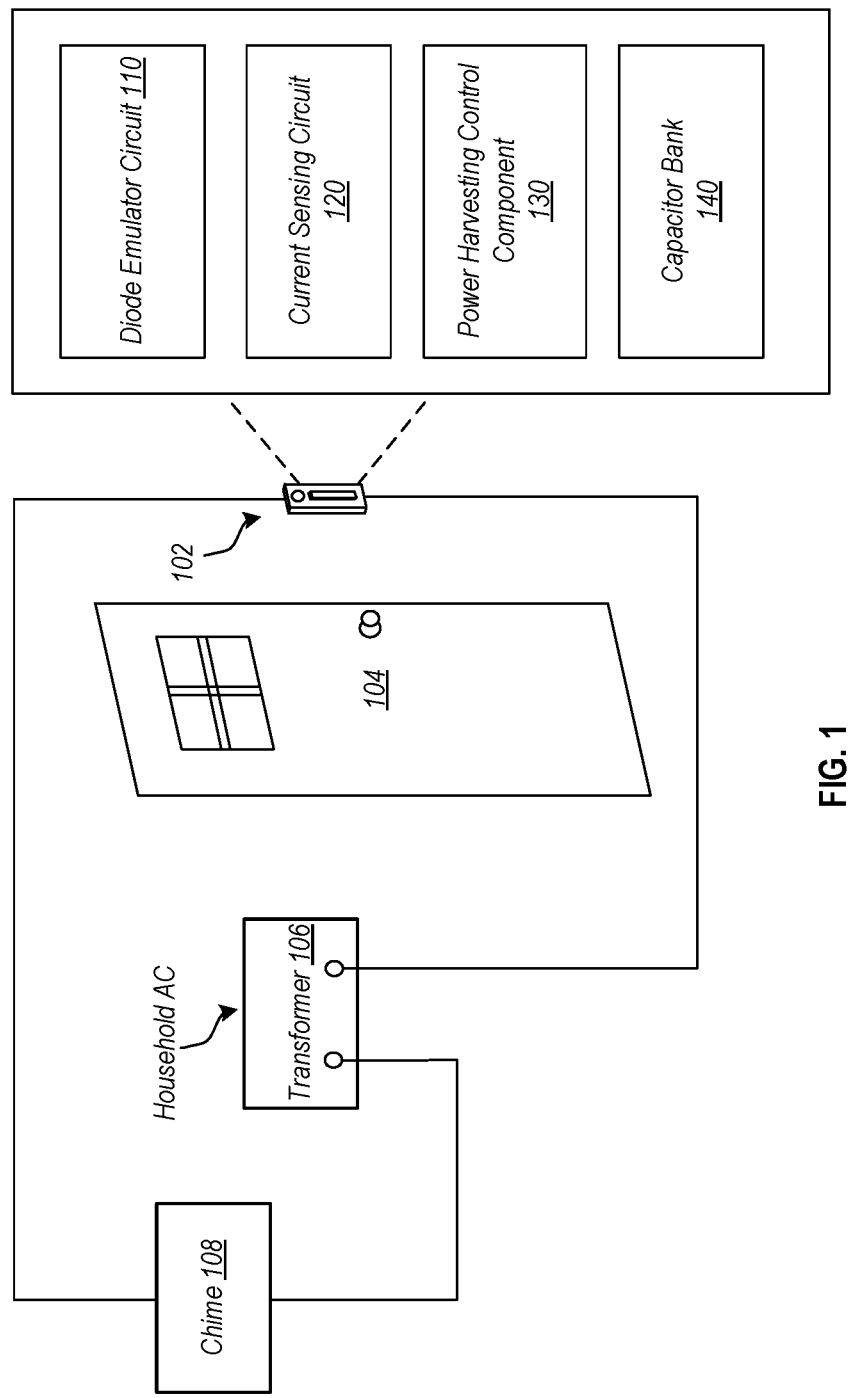
FIG. 1 is a diagram illustrating an example doorbell circuit architecture, in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

In various examples, a doorbell camera system architecture may include a camera and may be configured to capture image data, video data, and/or audio data. For example, a doorbell architecture may be positioned at an entrance to a home. The doorbell architecture may include a camera, at least one processing unit, and/or a wireless or wired transmitter. The doorbell architecture may be effective to detect motion within a field of view of the camera of the doorbell architecture (e.g., a person approaching the entrance to the home). In the example, in response to detecting motion, the at least one processor may be effective to control the camera to capture video data and may transmit the video data to one or more other computing devices over a network or wired connection. For example, the doorbell architecture may send the video to one or more remote computing devices for further processing and/or stream the video to a mobile device associated with an owner of the home. In at least some other examples, the doorbell architecture may control the camera to begin capturing video when the doorbell button is pressed or in response to detection of a human within a field-of-view of the camera.

In various examples, the doorbell may include one or more batteries that may be used to power the doorbell functions as described herein. Additionally, in at least some examples, the doorbell architecture may include connections and/or terminals for connecting the doorbell architecture to power line power of the building or other structure to which the doorbell is affixed. The vast majority of household doorbell circuits are configured to supply enough current to illuminate an incandescent (or other) light source within the doorbell architecture. Accordingly, in various example embodiments described herein, a doorbell circuit architecture is described that may dynamically access power from building wiring (e.g., the amount of power used to light an illuminated doorbell button) and dynamically switch between building line power and battery power, in order to extend the battery life of batteries of the doorbell architecture.

In current doorbell circuits (e.g., doorbell circuits installed in most houses) a large variety of chimes and transformers are used. Transformers often provide 16 VAC at 10 VA but 8V and 24V transformers may also be used. Chimes generally fall into two categories: electro-mechanical and electronic.

Electro-mechanical chimes typically have two solenoids in them, one electrically coupled to the front door button and the other electrically coupled to the rear door button. When the front doorbell button is pressed, the solenoid is actuated and briefly causes a pin to strike a metal plate that makes what is commonly referred to as a "ding" sound. When the front doorbell button is released, the pin in the solenoid, propelled by a return spring, overshoots the unpowered position and briefly strikes a metal plate that makes what is commonly referred to as a "dong" sound. The solenoid connected to a rear doorbell button is similar in operation to the front doorbell solenoid. However, in the portion of the chime that is electrically coupled to the rear doorbell solenoid, a mechanical stop prevents the plunger from striking the "dong" plate when the button is released allowing a user to differentiate between front doorbell and rear doorbell actuations. Accordingly, in many common chime and doorbell circuit architectures, the front doorbell button makes the "ding" and "dong" sounds when pressed and released, while the rear doorbell button only makes "ding" sounds when pressed.

Electronic chimes require power while emitting sounds and many play sounds, songs, and/or musical passages that are many seconds in duration. If an electronic chime is simply swapped with an electro-mechanical chime, the electronic chime receives power only when the doorbell button is depressed. However, since the average person does not depress a doorbell button for more than a second or two, an electronic chime is often unable to complete the song or musical passage in such an architecture. To address this problem, electronic chimes often require the user to install a diode in parallel with the doorbell button. The diode provides half wave line frequency power to the chime which, when saved in internal capacitors, provides power for playing the full duration of the song or musical passage. In such examples, the chime (e.g., a microcontroller of the chime) monitors the circuit for an input power signature consistent with the doorbell being pressed in order to prevent the song or music passage from playing constantly. When such an event is detected, the song or musical passage is played to completion and the electronic chime returns to the idle state. In many examples, a user must manually configure the microcontroller of such a doorbell to specify how long the chime lasts in order to prevent multiple playbacks and/or partial playback of the song/sound of the electronic chime. Electronic chimes are designed to be compatible with illuminated doorbell buttons. Accordingly, in electronic chimes, an impedance is typically placed across the inputs of the electronic chime to allow buttons to illuminate. The electronic chimes (e.g., a microcontroller of the electronic chime) may be designed to ignore the illumination current while checking for the input power signature signifying a doorbell press. In at least some examples, the diode may need to be installed in a particular orientation. Accordingly, a manufacturer of the electronic chime may provide instructions for the user to swap the diode connections if the electronic chime fails to function properly and/or if the song or musical passage fails to play to completion after diode installation.

In various examples described herein, a doorbell circuit architecture may be configured to emulate a diode configured in either direction and may detect the appropriate direction during installation to prevent improper installation. Additionally, in various examples described herein, doorbell circuit architectures may dynamically switch between line power and battery power, depending on the load on the power source to "harvest" as much line power as possible for camera and/or other doorbell components in order to extend battery life of the doorbell.

FIG. 1 is a diagram illustrating an example doorbell circuit architecture, in accordance with various aspects of the present disclosure. In the example depicted in FIG. 1, a doorbell 102 is installed near an entrance 104 (e.g., a doorway) into a home or other building. Although not shown in FIG. 1, in some examples, doorbell 102 may comprise at least one processor and a non-transitory computer-readable memory effective to store one or more instructions. Additionally, in some examples, doorbell 102 may comprise a camera device including an image sensor. For example, the doorbell 102 may comprise a charge coupled device (CCD) or a complementary metal-oxide semiconductor (CMOS) image sensor effective to capture image data and/or video data. In some further examples, the doorbell 102 may comprise an antenna, a transmitter, and/or a receiver for communicating with one or more other computing devices and/or systems. For example, in some embodiments, the doorbell 102 may be effective to send video captured using the camera to one or more other mobile devices associated with users of doorbell 102 (e.g., homeowners) over a network such as a local area network (LAN) or wide area network (WAN). Additionally, although not shown in FIG. 1, doorbell 102 may comprise one or more batteries effective to supply power to electronic components of doorbell 102, as required. Examples of such doorbell components may include the integrated camera and/or transmitter described above. In an example, the batteries of doorbell 102 may comprise one or more 1.5 AA lithium metal batteries.

Additionally, as shown in FIG. 1, doorbell may be electrically coupled to a transformer 106. In various examples, the transformer 106 may provide 16 VAC at 10 VA, 8V at 10 VA, and/or 24V at 20 VA. However, other transformers may be used apart from those listed in accordance with a desired implementation. Transformer 106 may be electrically coupled to line power (e.g., household AC power) and the secondary coil of transformer 106 may be coupled to chime 108 through a push-button switch of doorbell 102. In various examples, chime 108 may comprise an electro-mechanical and/or an electronic chime as described above.

As described in further detail below, doorbell 102 may comprise circuitry electrically coupled to household AC power (sometimes referred to as "wall power", "grid power", "mains power", "line power", "house wiring", etc.) and to chime 108. For example, doorbell 102 may comprise a diode emulator circuit 110. Diode emulator circuit 110 may simulate a diode across terminals of doorbell 102 in either direction. Additionally, diode emulator circuit 110 may be configured in such a way that no diode is simulated. The correct configuration of diode emulator circuit 110 may be determined using an onboarding procedure described in further detail below. Diode emulator circuit 110 may allow a song or musical passage of an electronic chime to play to completion based on a single, short-duration (e.g., <1 second) press of the doorbell, without requiring a user to install a physical diode component in the doorbell circuit. Further, diode emulator circuit 110 eliminates any requirement that a user install a physical diode component in the appropriate orientation in the circuit as the diode emulator circuit 110 can simulate a diode in either direction.

Doorbell 102 may comprise a current sensing circuit 120. In an example, current sensing circuit 120 may be used to determine whether or not an electronic or an electro-mechanical chime is being used, based on the current consumed during a ring event. As described in further detail below, doorbell 102 may use the type of chime to properly configure the doorbell 102 for the type of chime being used. As described in further detail below, the current sensing circuit 120 may be used to detect the current signature that occurs when chime 108 rings (e.g., produces the "ding-dong" sound and/or playback of an electronic song or musical passage). In other words, the current signature may be associated with actuation of the chime 108. During an onboarding procedure, a duty cycle of a pulse-width modulated signal generated by a processor of doorbell 102 may be adjusted for a particular operational state of the doorbell 102 and the camera of doorbell 102 to determine if the operational state causes the chime 108 to spuriously ring (e.g., spuriously actuate). A spurious ring of the chime may be caused by the camera (or other component of doorbell 102) consuming an amount of power that causes a sufficient amount of current to flow through chime 108 for the chime to ring. As described in further detail below, a pulse width modulated signal, or other control signal (e.g., a digital control signal) generated by the processor of doorbell 102 is configured during the onboarding process to control and maximize power provided by (e.g., "harvested from") the alternating current line power to components of doorbell 102. As described in further detail below, power-switching control component 130 (e.g., a power-switching control circuit) may be used to control the amount of power harvested from the AC line power of the building or other structure. In various examples, power-switching control component 130 may be a switching circuit that may be programmable or may be an application specific integrated circuit. In at least some examples, different duty cycles of the pulse width modulated signal may be associated with different operational states of doorbell 102. The duty cycle of a pulse width modulated signal may be conceptually used to establish a low voltage threshold on capacitor bank 140. In general, as the voltage from the capacitor bank 140 falls and approaches a low voltage threshold that would cause a spurious ringing of chime 108 (due to power consumption by the camera, for example), the duty cycle of the pulse width modulation signal configures power-switching control component 130 to switch from line power to power from the batteries of doorbell 102 to prevent the spurious ringing of chime 108. In some other examples, a single duty cycle of a pulse width modulated signal may be selected during onboarding to prevent spurious ringing of the chime 108 for the highest power states of a camera of doorbell 102.

In some examples, during onboarding the duty cycle of the pulse width modulated signal may be increased until a spurious ringing of chime 108 is caused. The ring may be detected using current sensing circuit 120 based on the current signature of the ringing event. Thereafter, the duty cycle is reduced (e.g., by 1%, 2%, 5%, etc.) and/or is set back to a previous, lower value to prevent spurious ringing during periods of high power consumption by doorbell 102. Although in the previous example a pulse width modulated signal is used, a different control signal may instead be used. For example, a microcontroller of doorbell 102 may provide a control signal that is effective to operate a voltage regulator to switch between AC line power and battery power.

In various examples, an indication of the duty cycle may be stored in a memory of doorbell 102 in association with an indication of the appropriate operational state. Examples of periods of high power consumption by doorbell 102 may include operational states where the image sensor of the camera is powered to capture video data and/or where a transmitter of the doorbell 102 is powered to transmit video data to one or more remote devices.

Figure 2:
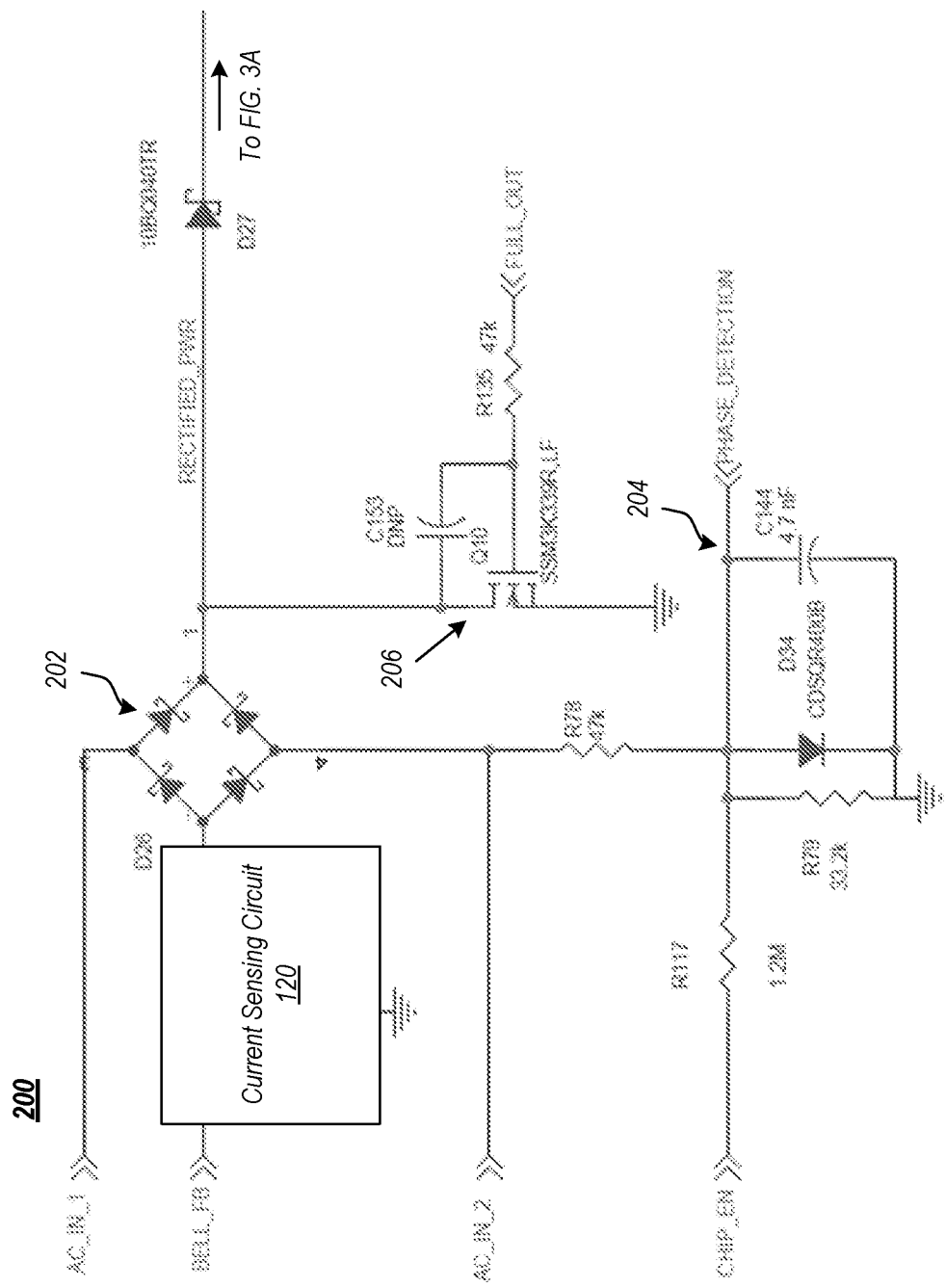
FIG. 2 illustrates an example circuit schematic for a diode emulator circuit, in accordance with various embodiments of the present disclosure.

FIG. 2 illustrates an example circuit schematic for a diode emulator circuit 200, in accordance with various embodiments of the present disclosure. Although FIG. 2 depicts one possible implementation of a diode emulator circuit, those of ordinary skill in the art will appreciate that other components may be used apart from those components shown in FIG. 2 to create a diode emulator circuit, in accordance with the present disclosure.

In various examples, in addition to eliminating the need to install a physical diode component in parallel with the doorbell button in the correct orientation, use of a diode emulator circuit allows more power to be tapped from house wiring when attached to an electronic chime, thereby prolonging battery life of doorbell 102. Electronic chimes consume relatively little power relative to electro-mechanical chimes. Accordingly, electronic chimes do not require most of the available household AC power so a diode emulator circuit, such as diode emulator circuit 200, can emulate a diode with a large forward voltage drop while maintaining normal functionality of an electronic chime. The power associated with the large forward voltage drop and the current through the chime may be used by doorbell 102 and components thereof, such as the camera. In diode emulator circuit 200, AC_IN_1 and AC_IN_2 (e.g., the terminals of doorbell 102) are coupled to the house wiring where a traditional doorbell button would be connected. The input is full-wave rectified by bridge rectifier circuit 202 (D26) to produce a positive pulse rectified electrical signal for each half-cycle of AC input current. Transistor 206 (Q10) acts as a switch that shorts out the output of the bridge rectifier circuit 202 (D26). Shorting the output of the bridge rectifier circuit 202 (e.g., to ground or to a node with a lower potential) has the effect of shorting the input as well. By timing when this short is applied (e.g., when transistor 206 is turned on), the diode emulator circuit 200 acts as a diode. By shorting all the first half cycles, the diode emulator circuit 200 acts as a diode in one direction and by shorting the second half cycles, the diode emulator circuit 200 acts as a diode in the other direction. When the transistor 206 is left on for both cycles, the circuit acts as a full short, functioning like a normal push-button switch and causing chime 108 to ring. In various examples, the ringing of the chime 108 may be triggered by a processor of doorbell 102 detecting a button push. In response to detection of a button push the processor may control (e.g., "turn on") transistor 206 for both half cycles resulting in sufficient current flowing through an electronic chime 108 to cause the chime to ring. The timing of the input current may be detected at the PHASE DETECTION node 204. The timing of the input current is used to generate the appropriate timing of transistor 206 (Q10) to implement diode emulation (e.g., forward-biased or reverse-biased, as desired). Diode emulator circuit 200 may emulate a diode for use with an electronic chime.

When performing diode emulation using transistor 206 (Q10), long wiring, excessively resistive wiring, and/or low transformer voltage may result in the forward drop of the emulated diode being fairly low. In turn, the forward drop of the voltage of the emulated diode being low may result in no power being harvested from house wiring for use by the camera of doorbell 102. The emulated diode mode may be used alone when the chime needs all the power the doorbell 102 can supply such as when ringing an electro-mechanical chime or the transformer voltage is very low.

In some examples, current sensing circuit 120 may be effective to determine the current through the house wiring. As previously described, current sensing circuit 120 may be used during an onboarding procedure to detect whether or not chime 108 has rung (e.g., made the appropriate sound). In turn, during onboarding, an indicator indicating whether or not chime 108 has rung in response to a particular operational state of doorbell 102 may be used to determine the duty cycle of a pulse width modulated control signal. The duty cycle of the pulse width modulated signal (or other control signal) may be used to determine whether to dynamically switch to power from batteries of doorbell 102 to prevent spurious ringing of the chime 108.

Various current sensing circuits and techniques known to those of skill in the art may be used to implement current sensing circuit 120. For example, shunt resistors may be used to measure the current on the house wiring across input terminals of doorbell 102. Additionally, the peak rectified voltage can be read by a processor of doorbell 102. The current sensing circuit 120 may be used to measure the current through the terminals of doorbell 102 and/or the peak voltage across the terminals of doorbell 102. Such measurements may simplify configuration and may detect possible installation errors. For example, if there is no current through the terminals of doorbell 102 during one of the two half cycles of line current, the user can be warned (e.g., through a companion application of the doorbell 102) that there may be a diode connected externally that should be removed. Additionally, if the line voltage is too low or too high, the user may be warned that the system may not work correctly.

Additionally, during configuration, the current sensing circuit 120 may determine whether or not an electronic chime has rung by sensing a current signature of the electronic chime. Additionally, a processor of doorbell 102 may set the diode emulator circuit to short out either the first half-cycles or second half-cycles of an input line power signal based on whether or not the current signature of an electronic chime is detected. In other words, if no current signature of the electronic chime is detected while shorting the first half-cycles, the processor may control transistor 206 to short the second half-cycles instead, and vice versa.

During configuration, if the current sensing circuit 120 determines based on a current signature of chime 108 that chime 108 is an electro-mechanical chime, transistor 206 (Q10) may be left off unless a button push is detected by a processor of doorbell 102. In general, when an electro-mechanical chime is used the doorbell 102 may harvest enough power from house line power to run various components (e.g., the camera) of doorbell 102 without causing a spurious ringing of chime 108 due to the increased power requirements of an electro-mechanical chime. Accordingly, during onboarding the duty cycle of a pulse width modulated control signal used to control injection house line current to the doorbell 102 architecture may be higher for an electro-mechanical chime relative to an electronic chime, for the same operational state of doorbell 102.

FIGS. 3A-3D depict various portions of an example circuit schematic 300 illustrating an example circuit architecture for a power-switching control component 130 and a capacitor bank 140, in accordance with various aspects of the present disclosure. Although FIGS. 3A-3D depict one possible implementation of a power-switching control component 130 and a capacitor bank 140, those of ordinary skill in the art will appreciate that other components may be used in different architectures apart from what is shown in FIGS. 3A-3D to create a power-switching control component 130 and/or a capacitor bank 140, in accordance with the present disclosure. The example circuit architectures depicted in FIGS. 3A-3D are one example implementation of the power-switching control component 130 and capacitor bank 140 described in the present disclosure. Other implementations that perform functions consistent with the present disclosure are possible and will be appreciated by those of ordinary skill in the art. By way of example, a system to dynamically switch between battery power and house line power may use operational amplifiers instead of the circuit architecture depicted in FIGS. 3A-3D, in accordance with the principles described herein.

In order for doorbell 102 to harvest power from the house wiring and extend the battery life of doorbell 102, there is a path from the rectified input current through D27 (FIG. 2) to capacitor bank 140 and switching regulator 304. In various examples, capacitor bank 140 may store at least a portion of the electrical energy of the rectified input current. In various examples, switching regulator 304 (U28) may be a switching buck regulator. The output of the switching regulator may be switched in parallel with the one or more batteries of doorbell 102 to accommodate the power needs of the doorbell 102 (including power requirements of an integrated camera and/or wireless transmitter). In the example depicted in FIGS. 3B and 3C, an additional control loop comprising transistors Q11 and Q15 may be used to take advantage of as much input power from the house wiring as possible while satisfying the constraints needed to prevent the chime 108 from being inadvertently triggered. A voltage regulator in its normal configuration takes as much power form its input as is needed to maintain the desired output voltage. The additional control loop comprising transistors Q11 and Q15 may be used to prevent a spurious ringing of chime 108 in response to a sudden increase in output demand for power, as might occur when video recording by a camera of doorbell 102 is initiated. Without the additional control loop, a sudden increase in output power demand may cause a load on the input that may be construed by the chime 108 as a switch closure (due to the current drawn through the chime 108) and result in the ringing of the chime 108 (e.g., playing the song or musical passage or producing the sound associated with chime 108).

Figure 3A:
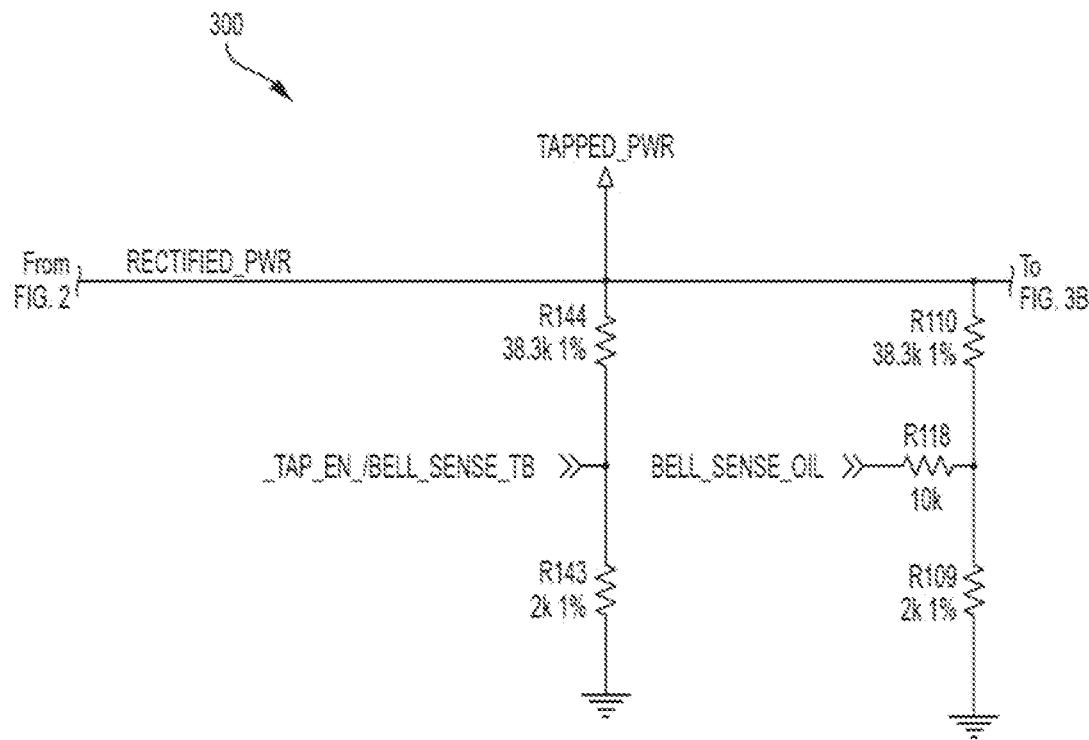
FIGS. 3A-3D depict an example circuit schematic for a battery power harvesting control component, in accordance with various aspects of the present disclosure.
Figure 3A:
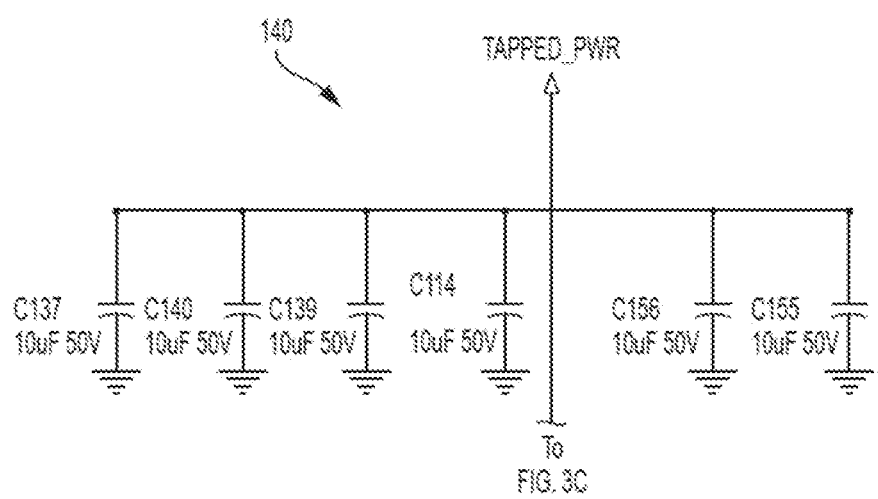
Figure 3B:
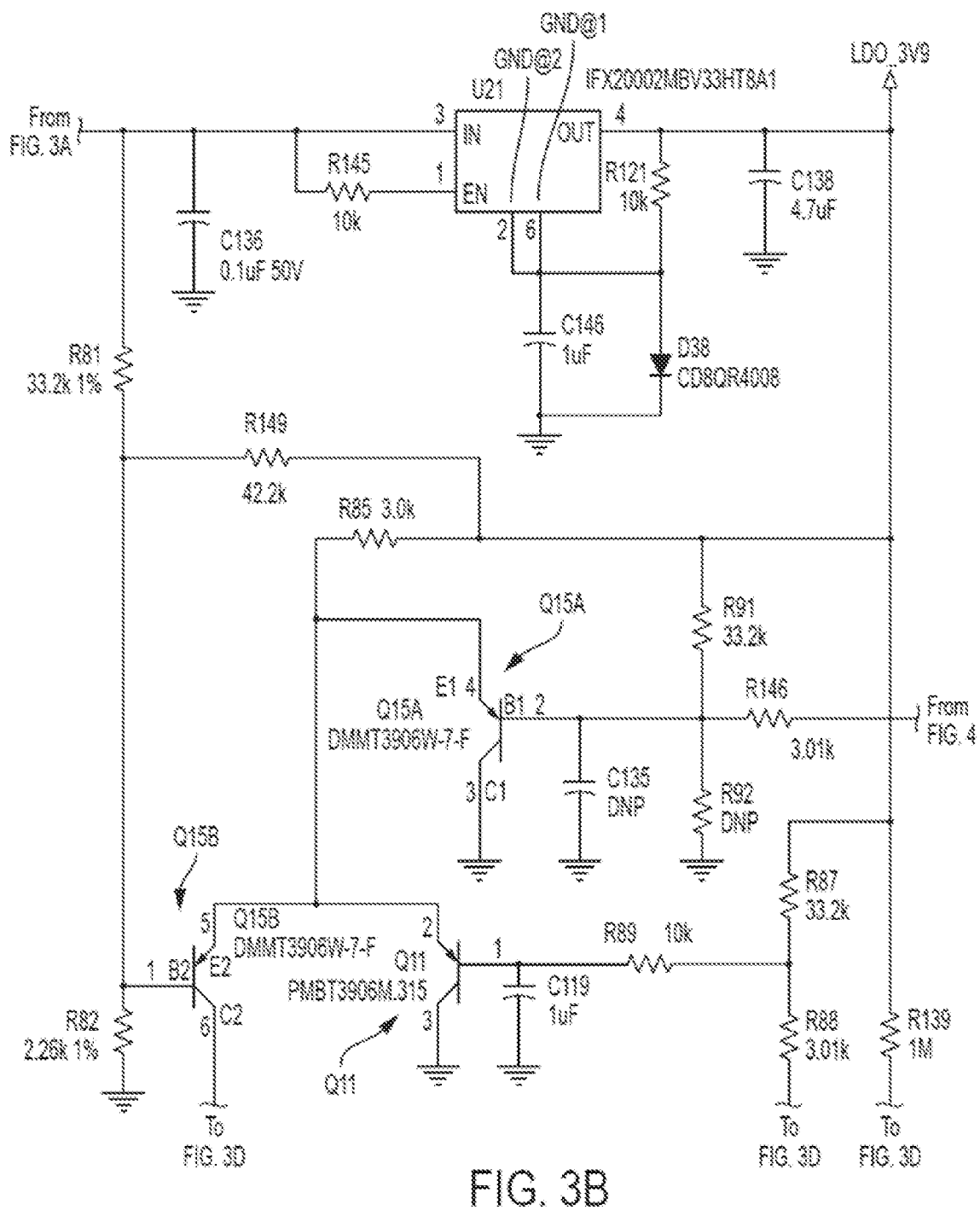
Figure 3C:
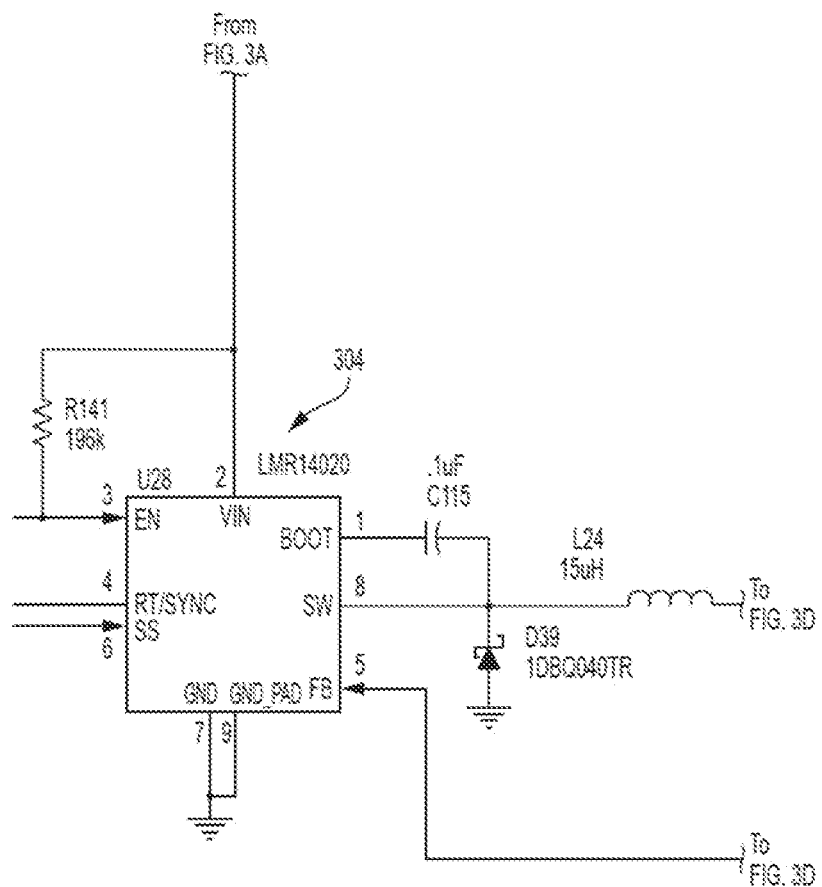
Figure 3D:
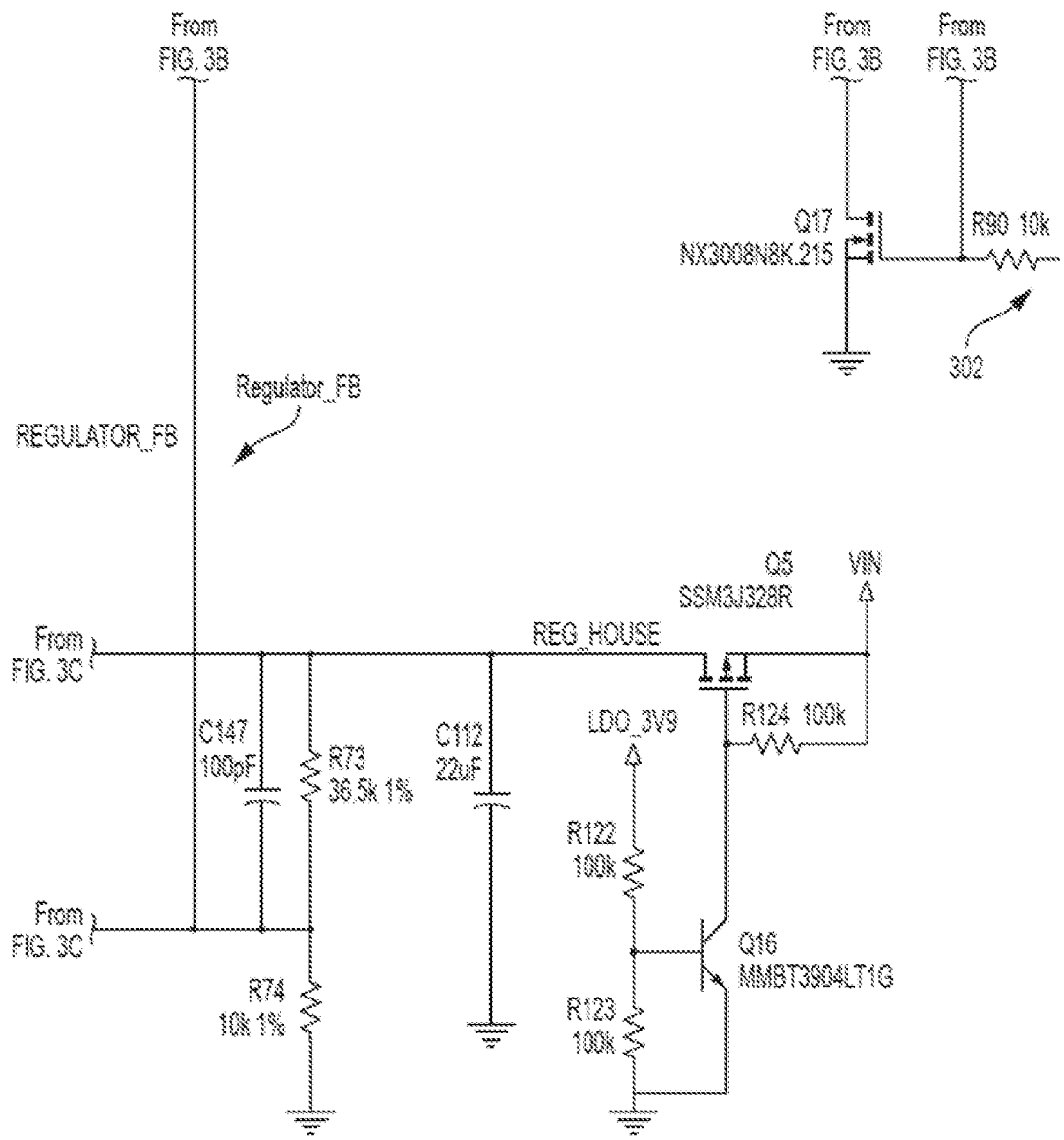

The additional control loop depicted in FIGS. 3B and 3C has three inputs which are connected to the bases of transistors Q15A, Q15B, and Q11. The output of the control loop is current through Regulator FB. Current through Regulator FB is injected into the feedback network of switching regulator 304 (U28) and has the effect of reducing the output voltage of the regulator. Reducing the output voltage reduces the output current, and therefore, the input current of the regulator. Current is injected from one or more batteries of doorbell 102 when the scaled filtered household line voltage falls below a threshold voltage set by the lower of the voltages at the bases of transistors Q15A and Q11. The voltage at the base of transistor Q11 is set by a duty cycle of a pulse width modulated signal from a processor of doorbell 102 (described above in the discussion of the onboarding procedure of doorbell 102) input at 302. The voltage at the base of transistor Q15A is set by a digital output of integrated circuit package U23 (depicted in FIG. 4). Q15A may be turned on during half cycles of the rectified signal output by bridge rectifier 202 (e.g., when the emulated diode is conducting). Q15A allows switching regulator 304 to take as much power from capacitor bank 140 as necessary to meet power requirements of doorbell 102 while the emulated diode is conducting. Conversely, Q11 limits how low the voltage may drop when the emulated diode is not conducting (e.g., during half cycles where Q10 is shorted to ground). Accordingly, the minimum voltage at which the switching regulator 304 takes power from capacitor bank 140 may be set using the duty cycle of the pulse width modulated signal provided by a processor of doorbell 102. As previously described, the duty cycle of this pulse width modulated signal may be set during onboarding of doorbell 102.

In other examples, (not depicted in FIGS. 3A-3D), the voltage from capacitor bank 140 may be detected by a processor. The processor may control switching regulator 304 to switch between power from capacitor bank 140 and from batteries of doorbell 102 based on the voltage at the capacitor bank 140. The processor may prevent the voltage at the capacitor bank 140 from falling below a level that causes a spurious ringing of chime 108 by harvesting power from batteries of doorbell 102. In various examples, the threshold voltage may be set at a minimum voltage that does not cause spurious ringing of chime 108 while doorbell 102 is in a configuration that consumes a maximum amount of power (e.g., when the camera of doorbell 102 is capturing video and/or when doorbell 102 is transmitting video data to another device using a wireless transmitter).

When an electro-mechanical chime is used, there is typically sufficient power available to operate doorbell 102 (e.g., including operation of an integrated camera of doorbell 102) and diode emulation by a diode emulator circuit 110 (e.g., the diode emulator circuit 200 depicted in FIG. 2 or some other diode emulator circuit) is typically not required. Accordingly, when an electro-mechanical chime is used, the power-switching control component 130 may be set to a constant voltage that is sufficient to prevent the electro-mechanical chime from actuating during camera operation of doorbell 102 (as well as other configurations of doorbell 102 with high power requirements). In various examples, such a constant voltage setting of power-switching control component 130 may provide a camera of doorbell 102 with sufficient power for standby-mode operation and/or for illuminating a button of doorbell 102. Depending on the installation (e.g., depending on the transformer voltage), a constant voltage configuration of power-switching control component 130 may be enough to run a camera of doorbell 102 in an active state (e.g., a state in which the camera is capturing video data) without requiring additional power from one or more batteries of doorbell 102. Additionally, if the house line power and/or capacitor bank 140 do not provide sufficient power, the described architecture allows one or more batteries of doorbell 102 to provide the additional power required to prevent spurious ringing of chime 108. In other words, a control signal (e.g., the PWM control signals described herein or a digital control signal) may be generated based on the particular transformer characteristics and/or based on the operational state of the camera during on-boarding that dynamically switches between battery power and line power (while maximizing use of line power) while preventing spurious ringing of the chime.

In examples where an electronic chime 108 is used, diode emulation with transistor switch 210 (identified as Q10 in FIG. 2) is used as well as dynamic power switching using, for example, regulator 304. During the half cycles where the diode emulator circuit 110 is "conducting", the switching regulator 304 is fully enabled. However, doorbell 102 and/or a camera thereof might be in a low power state (e.g., a standby mode) where the regulator does not take enough power to keep the emulated diode's voltage drop low enough for the chime 108 to receive sufficient power. To correct for this, a circuit (e.g., current sensing circuit 120) may monitor the rectified, filtered line voltage and may turn on the transistor Q11 switch if the voltage is too high (e.g., above a high voltage threshold). When the emulated diode is not supposed to be conducting, transistor Q11 may be turned off and the power-switching control component 130 may be set to a voltage that is high enough that the chime will not inadvertently activate.

In various examples, a standby mode of the doorbell 102 and/or a camera thereof may be a reduced-power state of the camera where the image sensor is powered, but is not capturing video, and where random access memory is maintained in a low and/or minimum power state. Additionally, in standby mode the doorbell 102 and/or camera may not transmit any image and/or video data to other devices, further minimizing power consumption. In various examples, detection of motion and/or the detection of a button push of doorbell 102 may trigger the doorbell 102 and/or a camera thereof to transition from a standby mode to an active mode during which video may be captured, streaming of data may occur, and subsystems of the camera may be operated, generally increasing the amount of power consumed.

Figure 4:
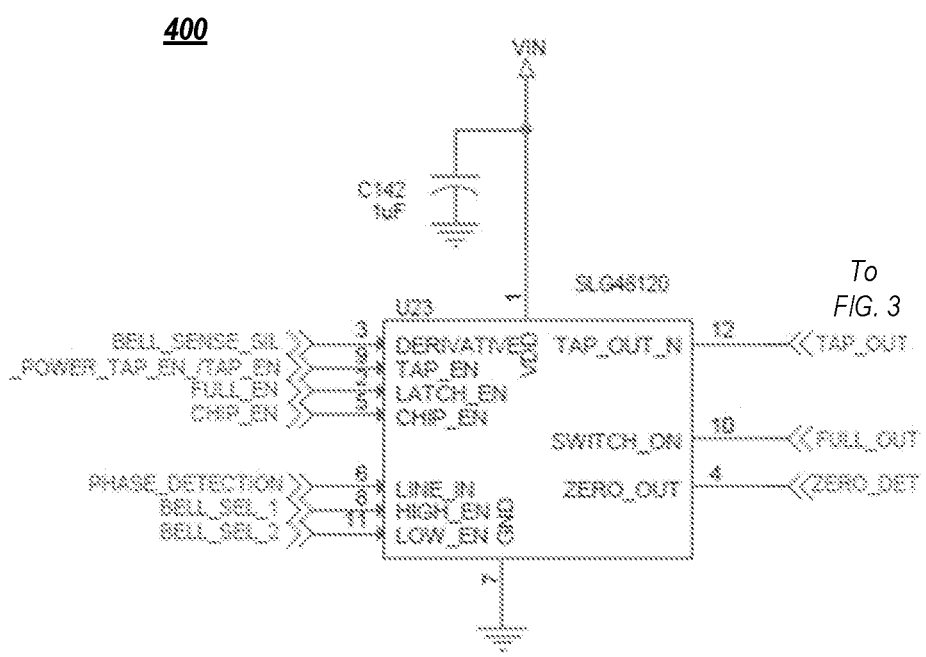
FIG. 4 depicts an example of an integrated circuit package that may be used in accordance with various aspects of the present disclosure.

FIG. 4 depicts an example of an integrated circuit package 400 that may be used in accordance with various aspects of the present disclosure. Integrated circuit package 400 may provide a digital output that may be used to set the voltage at the base of transistor Q15A of FIG. 3B. As previously described, in the example implementation of power-switching control component 130 depicted in FIGS. 3A-3D, current is injected by one or more batteries of doorbell 102 when the scaled filtered household line voltage falls below a threshold voltage set by the lower of the voltages at the bases of transistors Q15A and Q11. In various examples, the SWITCH ON output of integrated circuit package 400 may be used to control transistor 206 (e.g., Q10 in FIG. 2) and may therefore be used to trigger ringing of the chime 108 and used to emulate a diode in the proper orientation.

Figure 5:
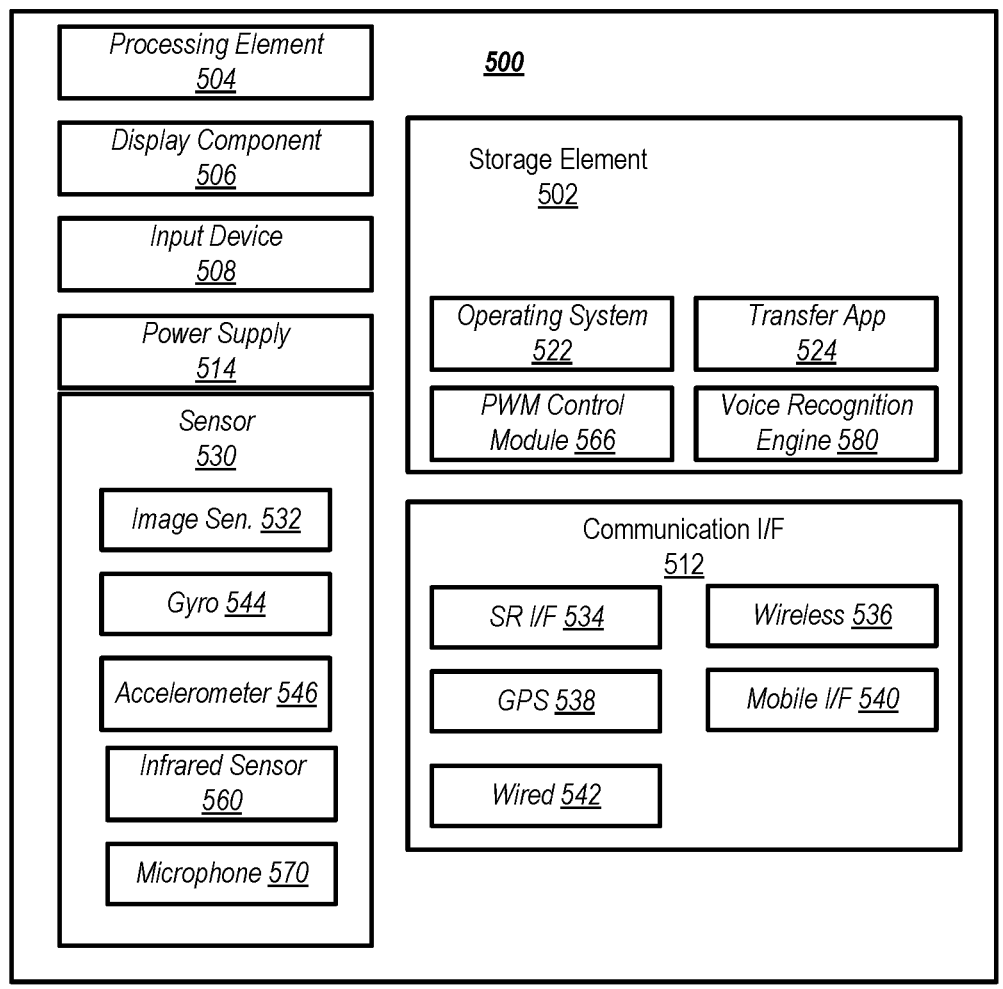
FIG. 5 is a block diagram showing an example architecture of a computing device, in accordance with various aspects of the present disclosure.

FIG. 5 is a block diagram showing an example architecture 500 of a computing device (e.g., doorbell 102 depicted in FIG. 1), in accordance with various aspects of the presente disclosure. It will be appreciated that not all user devices will include all of the components of the architecture 500 and some user devices may include additional components not shown in the architecture 500. The architecture 500 may include one or more processing elements 504 for executing instructions and retrieving data stored in a computer-readable non-transitory storage element 502. The processing element 504 may comprise at least one processor (e.g., a processor of doorbell 102 described herein). Any suitable processor or processors may be used. For example, the processing element 504 may comprise one or more digital signal processors (DSPs). In some examples, the processing element 504 may be effective to control operation of an integrated camera and/or to regulate the duty cycle of a pulse width modulated signal, as described herein. The computer-readable non-transitory storage element 502 can include one or more different types of memory, data storage, or computer-readable storage media devoted to different purposes within the architecture 500. For example, the computer-readable non-transitory storage element 502 may comprise flash memory, random-access memory, disk-based storage, etc. Different portions of the computer-readable non-transitory storage element 502, for example, may be used for program instructions for execution by the processing element 504, storage of images or other digital works, and/or a removable storage for transferring data to other devices, etc.

The computer-readable non-transitory storage element 502 may also store software for execution by the processing element 504. An operating system 522 may provide the user with an interface for operating the user device and may facilitate communications and commands between applications executing on the architecture 500 and various hardware thereof. A transfer application 524 may be configured to send and/or receive images, audio, and/or video from another device (e.g., a mobile device, image capture device, and/or display device) or from an image sensor 532 and/or microphone 570 included in the architecture 500. In some examples, the transfer application 524 may also be configured to send the received voice commands to a voice recognition server.

In some examples, computer-readable non-transitory storage element 502 may include pulse width modulation control module 566 effective to control the duty cycle of a pulse width modulated signal sent from diode emulator circuit 200 (e.g., from doorbell 102) to a power-switching control component 130. In various examples, the pulse width modulated signal and/or a duty cycle thereof may be used to set a minimum rectified filtered line voltage at which current from one or more batteries of doorbell 102 is injected into the circuit architecture to supply power to one or more components of doorbell 102 and/or to prevent spurious ringing of chime 108.

When implemented in some user devices, the architecture 500 may also comprise a display component 506. The display component 506 may comprise one or more light-emitting diodes (LEDs) or other suitable display lamps. For example, the display component 506 may comprise an LED for illuminating a button of doorbell 102. Also, in some examples, the display component 506 may comprise, for example, one or more devices such as cathode ray tubes (CRTs), liquid-crystal display (LCD) screens, gas plasmabased flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, user interface of a companion application, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice commands. Voice recognition engine 580 may interpret audio signals of sound captured by microphone 570. In some examples, voice recognition engine 580 may listen for a "wake-word" to be received by microphone 570. Upon receipt of the wake-word, voice recognition engine 580 may stream audio to a voice recognition server for analysis, as described above. In various examples, voice recognition engine 580 may stream audio to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as the various batteries of doorbell 102 discussed herein, a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other user devices (including, for example, mobile devices, tablet computers, display devices, and/or laptop computers, as well as other devices). For example, the communication interface 512 may comprise a wireless communication module 536 configured to communicate on a network according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, video data, and/or ambient light information.

Motion sensors may include any sensors that sense motion of the architecture including, for example, gyro sensors 544 and accelerometers 546. Motion sensors, in some examples, may be used to determine an orientation, such as a pitch angle and/or a roll angle, of a device of architecture 500. The gyro sensor 544 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 546 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 538 may be utilized as a motion sensor. For example, changes in the position of the architecture 500, as determined by the GPS interface 538, may indicate the motion of the GPS interface 538. Infrared sensor 560 may be effective to determine a distance between a surface and the device including the infrared sensor 560. In some examples, the infrared sensor 560 may determine the contours of the surface and may be capable of using computer vision techniques to recognize facial patterns or other markers within the field of view of the infrared sensor 560's camera. In some examples, the infrared sensor 560 may include an infrared projector and camera. Processing element 504 may build a depth map based on detection by the infrared camera of a pattern of structured light displayed on a surface by the infrared projector. In some other examples, the infrared sensor 560 may include a time of flight camera that may compute distance based on the speed of light by measuring the time of flight of a light signal between a camera of the infrared sensor 560 and a surface. Further, in some examples, processing element 504 may be effective to determine the location of various objects in the physical environment within the field of view of a device of architecture 500 based on the depth map created by the infrared sensor 560. As noted above, in some examples, non-infrared depth sensors, such as passive stereo camera pairs, or non-identical camera pairs, may be used in place of, or in addition to, infrared sensor 560. Processing element 504 may be effective to determine the location of various objects in the physical environment within the field of view of a camera of architecture 500 based on the depth map created by one or more non-infrared depth sensors.

Figure 6A:
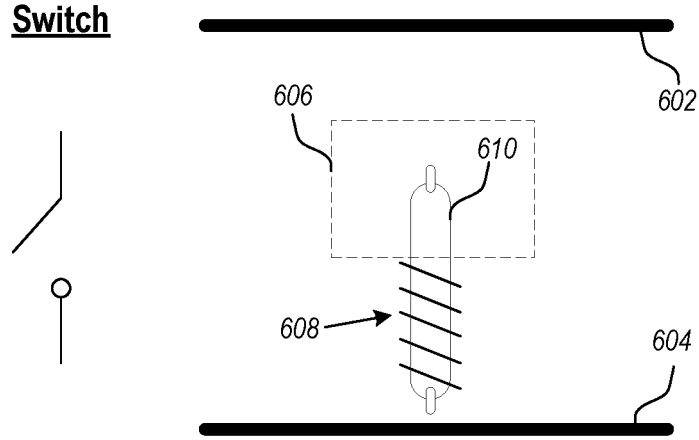
FIGS. 6A-6C depict an electro-mechanical doorbell chime operating in accordance with various aspects of the present disclosure.
Figure 6B:
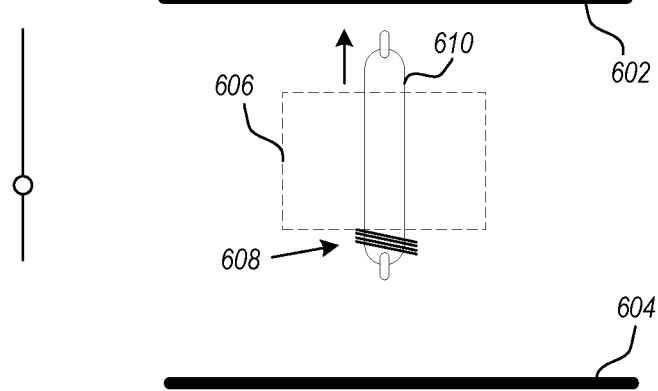
Figure 6C:
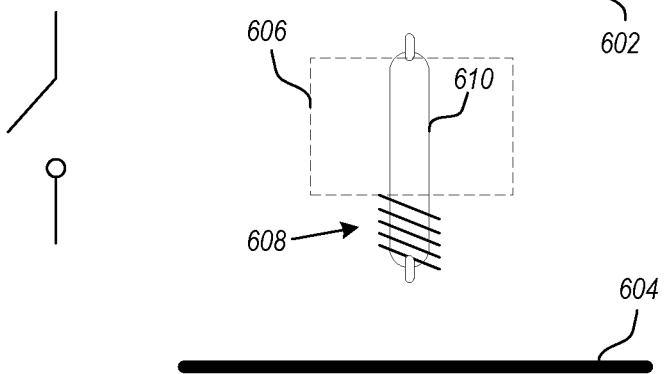

FIGS. 6A-6C depict an electro-mechanical doorbell chime operating in accordance with various aspects of the present disclosure. FIGS. 6A-6C depicts a solenoid 606 represented by a dashed box. Within the solenoid is a pin 610. The pin is disposed between two plates 602 and 604. In various examples, when the pin strikes plate 602 a "ding" sound may be produced. Similarly, when the pin strikes plate 604 a "dong" sound may be produced. In typical operation, when the switch controlling current through the solenoid is open, as depicted in FIG. 6A, the pin 610 (e.g., a striker pin) rests below the solenoid and is held in place by a spring 608 that is attached to one end of the pin 610 (e.g., the lower end in the depiction in FIGS. 6A-6C). The other end of spring 608 is attached to the lower portion of solenoid 606 or to a case surrounding the solenoid.

When the solenoid is actuated by closing the switch (FIG. 6B), the pin 610 is propelled through the solenoid and contacts the "ding" plate 602. The pin 610 thereafter rebounds through the force of gravity and due to a downward force exerted by the spring 608. While the switch remains closed, the pin 610 remains held in place by the solenoid, with a potential energy stored in the spring 608 that will pull the pin downward to strike the "dong" plate 604 when the switch is opened again. The pin 610 is thereafter returned to the equilibrium position due to spring 608 pulling the pin 610 from the dong plate 604 back to the rest position depicted in FIG. 6A.

In various examples described herein, current is used from the house wiring to power various components of doorbell 102 (e.g., to power a camera of doorbell 102). Such current causes some current to flow through the solenoid 606 which causes the pin 610 to be pulled from a normal rest position (as shown in FIG. 6A) to a position that is nearer to the ding plate 602. Accordingly, when the doorbell button of doorbell 102 is pressed (e.g., when transistor 206 (Q10) of FIG. 2 is shorted) to ring the chime 108, the pin does not have as far to move until it contacts the ding plate 602. FIG. 6C depicts an example where the pin 610 is moved closer to the ding plate 602 (relative to the rest position depicted in FIG. 6A) due to current consumption by one or more components of doorbell 102 causing a current to flow through solenoid 606. In various examples, this leads to a diminished volume of the "ding" sound.

Accordingly, in order to alleviate the situation described above in reference to FIG. 6C, a processor of doorbell 102 may be configured to adjust the duty cycle of the pulse width modulation control signal described above in reference to FIGS. 3A-3D to prevent the use of power from the house wiring in response to the detection of a button-push on doorbell 102. In some examples, the duty cycle of the pulse width modulation control signal may be gradually decreased so that the pin 610 moves gradually (e.g., over the course of 10-100 miliseconds) further away from the ding plate 602 without falling so far as to hit the dong plate 604. Thereafter, the microcontroller may short transistor Q10 to ground to enable the actuation of the solenoid and ringing of the electro-mechanical chime. In at least some other examples, instead of, or in combination with, adjusting the duty cycle of the pulse width modulated control signal, at least one processor of doorbell 102 may control the switching regulator 304 to gradually reduce the amount of power taken from household line power (e.g., reduce the amount of power taken from capacitor bank 140) in response to detection of a button push on doorbell 102. By gradually reducing the amount of household line power used by doorbell 102, the pin 610 may be moved further away from the ding plate 602. Thereafter, the processor of doorbell 102 may short transistor Q10 to ring the chime in response to the button push. Since the current consumed by doorbell 102 (and/or components thereof) is decreased over a time period of less than 100 milliseconds the ringing of the chime is not delayed for a period of time that would be considered significant to the average user.

Figure 7:
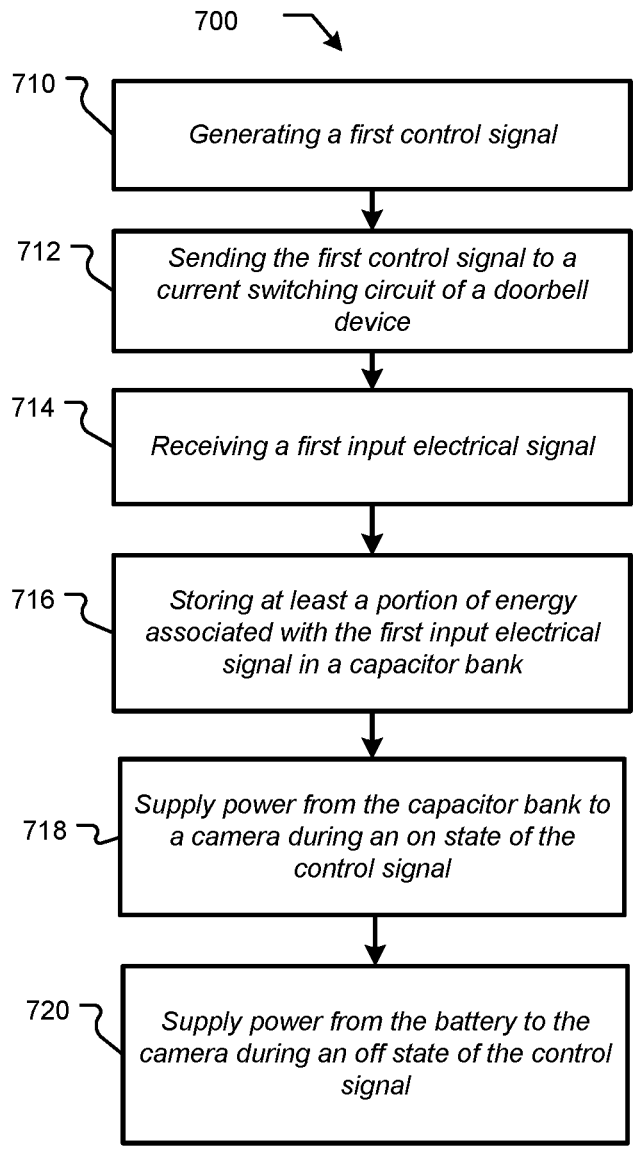
FIG. 7 depicts a flow chart illustrating an example process for dynamically switching between battery power and house line power, in accordance with various aspects of the present disclosure.

FIG. 7 depicts a flow chart illustrating an example process 700 for dynamically switching between battery power and house line power, in accordance with various aspects of the present disclosure. The process 700 of FIG. 7 may be executed by doorbell 102 and/or by some other computing device such as the various computing architectures described in reference to FIG. 5, in accordance with various aspects of the present disclosure. The actions of process flow 700 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process flow 700 may be described with reference to elements of FIGS. 1-6.

At action 710 of process flow 700, a first control signal may be generated. In various examples, the first control signal may be a pulse width modulated signal with a duty cycle associated with a particular operational state of doorbell 102. The control signal may be directed to a control circuit of doorbell 102, as depicted in FIGS. 3A-3D. In various examples, the control signal may be used to control a switching regulator (e.g., switching regulator 304) to switch between supplying power from one or more batteries of doorbell 102 and power from the household line power to satisfy power requirements of doorbell 102 and/or a camera thereof.

Processing may continue from action 710 to action 712, wherein the first control signal is sent to a power-switching control circuit of the doorbell device. In various examples, the first control signal may be used in a control loop and may be effective to turn on and off a switching regulator to switch from battery current to household line current stored in capacitor bank 140.

Processing may continue from action 712 to action 714. In various examples, the first input electrical signal may be an alternating current electrical signal received from house line power. In various examples, and as described above in reference to FIG. 2, the received first input electrical signal may be rectified using a bridge rectifier circuit and may, in some examples (e.g., examples where an electronic chime is used), use a diode emulation circuit to short out half-cycles of the wave form of the first input electrical signal.

Processing may continue from action 714 to action 716." At action 716, the power-switching control circuit may be effective to store at least some of the electrical energy of the first input electrical signal in a plurality of capacitors (e.g., capacitor bank 140). In various examples, storage of at least a portion of the electrical energy in the plurality of capacitors may allow the wave form of the rectified signal to be smoothed in order to provide enough power to power an electronic chime for the full duration of the song, sound, and/or musical passage associated with the electronic chime.

Processing may continue from action 716 to action 718. In various examples, the control signal may have a duty cycle comprising an "ON" state (e.g., at which a positive voltage is supplied) and an "OFF" state (e.g., at which a lower voltage, such as 0V, is supplied). The two states of the duty cycle of the control signal may be effective to control a switch (e.g., switching regulator 304) to switch between household line power and battery power to operate the camera of doorbell 102. Accordingly, at action 718, a first state of the control signal may, in some examples, turn a switching regulator on, causing power to be harvested from household line power (e.g., as stored in capacitor bank 140). In at least some examples, the duty cycle of the control signal may supply an amount of power that is associated with an operational state of the doorbell camera system (e.g., an amount of power consumed by the doorbell camera system while in a particular operational state).

Processing may continue from action 718 to action 720. At action 720, the switching regulator 304 or some other control component may be controlled by a control signal to switch from household line power to battery power. In various examples, and as described above, a duty cycle of a pulse width modulated signal may be selected such that current from the battery is injected to doorbell 102 to avoid a low voltage condition that would cause a spurious ringing of chime 108.

Among other potential benefits, a system in accordance with the present disclosure may allow for simplified installation of a video-enabled doorbell irrespective of whether an electronic or electro-mechanical chime is currently in use. Furthermore the current architecture does not require an installation of an external diode to ensure that the entire duration of an electronic chime is played back when the doorbell is pressed (or otherwise actuated). Further, the current measuring component of the doorbell circuit architecture described herein allows for a simplified onboarding procedure that can automatically determine the appropriate (e.g., maximum) amount of power that may be harvested from house wiring without causing a spurious ringing of the chime thereby extending battery life of the doorbell. The current sensing component does this by detecting the current signature of a doorbell button push and the processor of the doorbell adjusts the duty cycle of a pulse width modulated control signal to ensure that a spurious chime ring does not occur during a particular operational state of the doorbell. In addition, the current measuring component can detect that line voltage is too high or too low and may warn a user that the doorbell may not function properly. The doorbell architecture described herein can detect, based on the current signature of the doorbell button push, whether an electronic or electro-mechanical chime is being used and configure the architecture appropriately, without user input. The doorbell architecture described herein may use power from house wiring during both half cycles of line current even while emulating a diode across the input terminals of the doorbell architecture. The doorbell architecture described herein is able to dynamically switch between power from house wiring and battery power based on power demand of doorbell components. Further, due to diode emulation a user is not required to manually configure a length of time for which playback of an electronic chime is to occur. No modification of an existing chime is required to use the doorbell architecture described herein. Finally, techniques are described to prevent the volume of an electro-mechanical chime from being diminished due to the harvesting of household line power causing a current to pull the pin of an electro-mechanical chime closer to a sounding plate.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of operating a doorbell camera system comprising a power-switching control circuit, a battery, and a camera, the method comprising:
generating a first pulse width modulated signal having a first duty cycle, the first duty cycle associated with a first operational state of the camera, the first pulse width modulated signal defining a first voltage threshold used to avoid spurious ringing of a chime electrically coupled to the doorbell camera system, wherein the first duty cycle defines an "on" state and an "off" state of the first pulse width modulated signal;
receiving, by the power-switching control circuit, the first pulse width modulated signal;

receiving, by the power-switching control circuit, first half-cycles of a rectified electrical signal;
storing at least a portion of electrical energy of the first half-cycles of the rectified electrical signal in a plurality of capacitors;
operating a switching regulator of the power-switching control circuit to supply a first amount of power from the plurality of capacitors to the camera during the "on" state of the first pulse width modulated signal, wherein the first amount of power is consumed by the camera during the first operational state of the camera; and
operating the switching regulator of the power-switching control circuit to supply the first amount of power from the battery to the camera during the "off" state of the first pulse width modulated signal.

2. The method of claim 1, further comprising:
receiving, by a bridge rectifier circuit of a diode emulator circuit of the doorbell camera system, a 16 volt alternating current electrical signal;
outputting, by the bridge rectifier circuit, the rectified electrical signal comprising the first half-cycles and second half-cycles;
shorting, by the diode emulator circuit, the second half-cycles of the rectified electrical signal to ground; and
sending, by the diode emulator circuit, the first half-cycles of the rectified electrical signal to the power-switching control circuit.

3. The method of claim 1, further comprising:
determining, by a current sensing circuit, a current signature associated with actuation of the chime;
generating the first pulse width modulated signal with an initial duty cycle;
sending the first pulse width modulated signal with the initial duty cycle to the power-switching control circuit;
operating the camera in the first operational state;
determining a third current across input terminals of the doorbell camera system;
determining that the chime was not actuated during the first operational state of the camera based at least in part on the third current not corresponding to the current signature associated with actuation of the chime; and
generating the first pulse width modulated signal with the first duty cycle, wherein the first duty cycle is higher than the initial duty cycle.

4. A camera system, comprising:
at least one processor;
a camera;
a battery; and
a power-switching control circuit comprising a switching regulator;
the at least one processor programmed to:
generate a first control signal, wherein the first control signal is a first pulse-width modulated signal with a first duty cycle comprising a first state and a second state; and
send the first control signal to the power-switching control circuit;
the power-switching control circuit effective to:
receive the first control signal;
receive a first electrical signal;
store at least a portion of energy from the first electrical signal in at least one capacitor;
operate the switching regulator to supply power from the at least one capacitor to the camera during the first state of the first control signal; and
operate the switching regulator to supply power from the battery to the camera during the second state of the first control signal.

5. The camera system of claim 4, further comprising:
a bridge rectifier circuit effective to:
receive an alternating current electrical signal; and
generate a rectified electrical signal comprising first half-cycles and second half-cycles; and
a first transistor effective to generate the first electrical signal by shorting the first half-cycles of the rectified electrical signal to ground.

6. The camera system of claim 4, wherein the first control signal is based on a first operational state of the camera, and wherein the at least one processor is further effective to:
determine a second operational state of the camera; and
determine a second control signal associated with the second operational state of the camera, wherein the second control signal is effective to change an amount of power supplied from the battery relative to the first control signal.

7. The camera system of claim 4, wherein the power-switching control circuit is electrically coupled to a chime the camera system further comprising:
a current sensing circuit effective to determine a current signature associated with ringing of the chime;
wherein the at least one processor is further effective to:
send the first control signal to the power-switching control circuit;
determine that a third current detected by the current sensing circuit corresponds to the current signature associated with the ringing of the chime; and
decrease the first duty cycle of the first control signal to a second duty cycle less than the first duty cycle.

8. The camera system of claim 4, wherein the at least one processor is further effective to:
determine based on a current signature of a third current of the power-switching control circuit that a chime electrically coupled to the power-switching control circuit is an electronic chime;
determine a phase of the first electrical signal; and
operate a switch to short half cycles of the first electrical signal to ground.

9. The camera system of claim 4 further comprising a button, and the at least one processor is further effective to:
detect operation of the button;
operate the power-switching control circuit to decrease the first duty cycle of the first control signal to a second duty cycle less than the first duty cycle, wherein the second duty cycle causes a striker pin of an electro-mechanical chime to return to a rest position; and
operate a switch of the power-switching control circuit to cause a first current to flow through the electro-mechanical chime, the first current effective to actuate the electro-mechanical chime.

10. The camera system of claim 4, further comprising a button, wherein the at least one processor is further effective to:
detect a push of the button; and
electrically couple an input of a bridge rectifier circuit to ground causing a chime electrically coupled to the power-switching control circuit to ring.

11. The camera system of claim 4, further comprising:
a current sensing circuit effective to determine a current signature associated with actuation of a chime electrically coupled to the power-switching control circuit;
wherein the at least one processor is effective to generate the first control signal, wherein the first duty cycle corresponds to a first operational state of the camera, wherein the at least one processor is effective to generate the first control signal with the first duty cycle by:
generating a second pulse width modulated signal with an initial duty cycle;
sending the second pulse width modulated signal with the initial duty cycle to a switching regulator of the power-switching control circuit;
operating the camera in the first operational state;
determining a first current generated in response to the initial duty cycle of the first pulse width modulated signal;
determining that the chime was actuated during operation of the camera in the first operational state based at least in part on the first current matching the current signature associated with actuation of the chime;
generating the first pulse width modulated signal with the first duty cycle for the first operational state of the camera, wherein the first duty cycle is lower than the initial duty cycle;
sending the first pulse width modulated signal with the first duty cycle to the switching regulator of the power-switching control circuit;
operating the camera in the first operational state;
determining a second current generated in response to the first duty cycle of the first pulse width modulated signal;
determining that the chime was not actuated during operation of the camera in the first operational state based at least in part on the second current not corresponding to the current signature associated with actuation of the chime; and
storing, in a non-transitory computer-readable memory of the camera system, a first indication of the first duty cycle in association with a second indication of the first operational state of the camera.

12. The camera system of claim 4, wherein the at least one processor is further effective to:
generate a second pulse width modulated signal with a second duty cycle when the camera is in a standby mode; and
generate a third pulse width modulated signal with a third duty cycle when the camera is in an active mode, wherein the third duty cycle is higher than the second duty cycle.

13. A method of operating a doorbell system, comprising:
generating, by at least one processor of a doorbell device, a first control signal, wherein the first control signal is a first pulse-width modulated signal with a first duty cycle comprising a first state and a second state;
sending, by the at least one processor, the first control signal to a power-switching control circuit of the doorbell device;
receiving, by the power-switching control circuit, a first electrical signal;
storing, by the power-switching control circuit, at least a portion of energy from the first electrical signal in at least one capacitor of the power-switching control circuit;
supplying, by the power-switching control circuit, power from the at least one capacitor to a camera of the doorbell device during the first state of the first control signal; and
supplying, by the power-switching control circuit, power from a battery of the doorbell device to the camera during the second state of the first control signal.

14. The method of claim 13, further comprising:
receiving an alternating current electrical signal;
generating a rectified electrical signal comprising first half-cycles and second half-cycles; and
generating the first electrical signal by shorting the first half-cycles of the rectified electrical signal to ground.

15. The method of claim 13, wherein the first control signal is based on a first operational state of the camera, the method further comprising:
determining, by the at least one processor, a second operational state of the camera; and
determining, by the at least one processor, a second control signal associated with the second operational state of the camera, wherein the second control signal is effective to change an amount of power supplied from the battery relative to the first control signal.

16. The method of claim 13, wherein the power-switching control circuit is electrically coupled to a chime, the method further comprising:
determining a current signature associated with ringing of the chime;
sending, by the at least one processor, the first control signal to the power-switching control circuit;
determining, by the at least one processor, that a third current of the power-switching control circuit corresponds to the current signature associated with the ringing of the chime; and
decreasing the first duty cycle of the first control signal to a second duty cycle less than the first duty cycle.

17. The method of claim 13, further comprising:
determining based on a current signature of a third current of the power-switching control circuit that a chime electrically coupled to the power-switching control circuit is an electronic chime;
determining a phase of the first electrical signal; and
operating a switch to short half cycles of the first electrical signal to ground.

18. The method of claim 13, further comprising:
detecting operation of a button of the doorbell device;
decreasing the first duty cycle of the first control signal to a second duty cycle less than the first duty cycle, wherein the second duty cycle causes a striker pin of an electro-mechanical chime to return to a rest position; and
operating a switch of the power-switching control circuit to cause a first current to flow through the electro-mechanical chime, the first current effective to actuate the electro-mechanical chime.

19. The method of claim 13, further comprising:
detecting a push of a button of the doorbell device; and
electrically coupling an input of a bridge rectifier circuit to ground causing a chime electrically coupled to the power-switching control circuit to ring.

20. The method of claim 13, further comprising:
determining a current signature associated with actuation of a chime electrically coupled to the power-switching control circuit; and
generating the first control signal, wherein the first duty cycle corresponds to a first operational state of the camera, wherein the generating the first control signal with the first duty cycle further comprises:
generating a second pulse width modulated signal with an initial duty cycle;
sending the second pulse width modulated signal with the initial duty cycle to a switching regulator of the power-switching control circuit;
operating the camera in the first operational state;

determining a first current generated in response to the initial duty cycle of the first pulse width modulated signal;

determining that the chime was actuated during operation of the camera in the first operational state based at least in part on the first current matching the current signature associated with actuation of the chime;

generating the first pulse width modulated signal with the first duty cycle for the first operational state of the camera, wherein the first duty cycle is lower than the initial duty cycle;

sending the first pulse width modulated signal with the first duty cycle to the switching regulator of the power-switching control circuit;

operating the camera in the first operational state;

determining a second current generated in response to the first duty cycle of the first pulse width modulated signal;

determining that the chime was not actuated during operation of the camera in the first operational state based at least in part on the second current not corresponding to the current signature associated with actuation of the chime; and storing, in a computer-readable non-transitory memory of the doorbell device, a first indication of the first duty cycle in association with a second indication of the first operational state of the camera.

* * * * *